US012090653B2

(12) United States Patent
Yoshimi et al.

(10) Patent No.: US 12,090,653 B2
(45) Date of Patent: Sep. 17, 2024

(54) ASSIST DEVICE

(71) Applicant: JTEKT CORPORATION, Osaka (JP)

(72) Inventors: Yoshitaka Yoshimi, Kashiba (JP);
Kazuyoshi Ohtsubo, Chiryu (JP);
Tomoki Arai, Kitakatsuragi-gun (JP);
Hiromichi Ohta, Kariya (JP)

(73) Assignee: JTEKT CORPORATION, Kariya (JP)

( * ) Notice: Subject to any disclaimer, the term of this patent is extended or adjusted under 35 U.S.C. 154(b) by 323 days.

(21) Appl. No.: 17/015,260

(22) Filed: Sep. 9, 2020

(65) Prior Publication Data

US 2021/0078162 A1 Mar. 18, 2021

(30) Foreign Application Priority Data

Sep. 12, 2019 (JP) ................................. 2019-166171
Oct. 15, 2019 (JP) ................................. 2019-188544
Apr. 27, 2020 (JP) ................................. 2020-078669

(51) Int. Cl.
*B25J 9/00* (2006.01)
*A61H 1/02* (2006.01)
*A61H 3/00* (2006.01)
*B25J 9/10* (2006.01)
*B25J 9/12* (2006.01)

(52) U.S. Cl.
CPC .......... *B25J 9/0006* (2013.01); *A61H 1/0262* (2013.01); *A61H 3/00* (2013.01); *B25J 9/102* (2013.01); *B25J 9/104* (2013.01); *B25J 9/12* (2013.01); *A61H 2003/007* (2013.01);
(Continued)

(58) Field of Classification Search
CPC ........ B25J 9/0006; A61H 1/0262; A61H 3/00; A61H 2003/007; A61H 2201/1215; A61H 2201/149; A61H 2201/1652
See application file for complete search history.

(56) References Cited

U.S. PATENT DOCUMENTS

2015/0190713 A1* 7/2015 Goetgeluk ............ A63F 13/216
345/156
2017/0027735 A1* 2/2017 Walsh ................... A61F 5/0123
(Continued)

FOREIGN PATENT DOCUMENTS

| CN | 105873555 A | 8/2016 |
|---|---|---|
| CN | 107627291 A | 1/2018 |
| JP | 2018-199205 A | 12/2018 |

OTHER PUBLICATIONS

U.S. Appl. No. 16/808,447, filed Mar. 4, 2020, Sato et al.
(Continued)

*Primary Examiner* — Jerrah Edwards
*Assistant Examiner* — Aren Patel
(74) *Attorney, Agent, or Firm* — Oblon, McClelland, Maier & Neustadt, L.L.P.

(57) ABSTRACT

An assist device includes a first harness, a second harness, a belt body, an actuator and a controller. The controller is configured to perform operation control of the actuator. The controller is configured to, upon operation of the actuator being started in a state in which the first harness and the second harness is fitted to the user, perform winding of the belt body with a first winding force, and is configured to, upon the winding of the belt body being completed, change the winding force of the actuator to a second winding force that is smaller than the first winding force.

8 Claims, 11 Drawing Sheets

(52) U.S. Cl.
CPC ............ *A61H 2201/1215* (2013.01); *A61H 2201/149* (2013.01); *A61H 2201/1652* (2013.01)

(56) References Cited

U.S. PATENT DOCUMENTS

| | | | |
|---|---|---|---|
| 2018/0272525 A1 | 9/2018 | Kumeno et al. | |
| 2018/0325764 A1* | 11/2018 | Yagi | B25J 11/009 |
| 2019/0282900 A1* | 9/2019 | Goetgeluk | A63F 13/216 |
| 2020/0093679 A1* | 3/2020 | Sonar | G01L 5/228 |
| 2020/0117171 A1* | 4/2020 | Takahashi | H04L 25/4902 |
| 2020/0179218 A1* | 6/2020 | Katoh | A61H 3/00 |
| 2020/0268542 A1* | 8/2020 | Holgate | A61F 5/024 |

OTHER PUBLICATIONS

Office Action issued May 21, 2024, in corresponding Chinese Patent Application No. CN202010946760.7 (with English translation), 19 pages.

* cited by examiner

ASSIST DEVICE

CROSS-REFERENCE TO RELATED APPLICATION

This application claims priority to Japanese Patent Application No. 2019-166171 filed on Sep. 12, 2019, Japanese Patent Application No. 2019-188544 filed on Oct. 15, 2019, and Japanese Patent Application No. 2020-078669 filed on Apr. 27, 2020, each incorporated herein by reference in its entirety.

BACKGROUND

1. Technical Field

The present disclosure of the present disclosure relates to an assist device.

2. Description of Related Art

Various assist devices that assist a user's work by being worn on the body of the user (human being) have been proposed. For example, even where a user lifts a heavy object, an assist device enables the user to perform the work with a small strength (burden). Such assist device is disclosed in, for example, Japanese Unexamined Patent Application Publication No. 2018-199205 (JP 2018-199205 A).

SUMMARY

The assist device disclosed in JP 2018-199205 A includes a frame made of, e.g., a metal, the frame being fitted to a user. An output of an actuator mounted in the frame is transmitted to the upper body and the lower body of the user through a link mechanism. Consequently, for example, a motion of lifting a heavy object is assisted.

Examples of motions for which a user needs assistance include motions of assisting (helping) a person such as a patient or an elderly person in activities of daily living in addition to motions involving a large burden such as lifting a heavy object. When a user performs work involving a heavy burden, a high-power assist device such as one disclosed in JP 2018-199205 A is effective.

However, when a user assists a person such as a patient or an elderly person, a high-power assist device may be excessive in performance. Also, a high-power assist device uses many rigid members such as a link mechanism and a frame made of, e.g., metal, and has a solid configuration in order to achieve a high output. Therefore, the assist device is heavy in weight and movement of the user is restricted by the rigid members.

Therefore, the inventor of the present disclosure has already proposed assist devices that are light in weight and provide good wear comfort (for example, Japanese Patent Application No. 2019-043462). Each of such assist devices includes a first harness to be fitted to a shoulder region of a user, second harnesses to be fitted to left and right leg regions of the user, a belt body provided so as to extend to the first harness and to the second harnesses along the back side of the user, and an actuator. The actuator is provided in the first harness and enables winding and unwinding a part of the belt body.

Upon the actuator winding a part of the belt body, tension acts on the belt body. The tension serves as an assist force and acts on the user. Consequently, for example, when the user assists a person as stated above, a burden is reduced.

Assist devices each including a belt body such as above are used by users of various body sizes. Therefore, where a length of the belt body is set according to, for example, a standard body height, if a user having a body height that is higher than the standard body height wears the assist device, the belt body is unnecessarily pulled. Then, the assist device may fail to generate a proper assist force or make it difficult for the user to walk easily.

The present disclosure provides an assist device that is light in weight, provides good wear comfort and enables generating an assist force according to the body size of a user.

An assist device according to one aspect of the present disclosure includes a first harness, a second harness, a belt body, an actuator and a controller. The first harness is configured to be fitted to at least one of a shoulder region and a breast region of a user. The second harness is configured to be fitted to a leg region or a waist region of the user. The belt body is provided so as to extend to the first harness and to the second harness along the back side of the user. The actuator is provided in one harness of the first harness and the second harness and is configured to wind and unwind a part of the belt body. The controller is configured to perform operation control of the actuator. The controller is configured to, upon operation of the actuator being started in a state in which the first harness and the second harness are fitted to the user, perform winding of the belt body with a first winding force, and is configured to, upon the winding of the belt body being completed, change the winding force of the actuator to a second winding force that is smaller than the first winding force.

With the assist device according to the aspect of the present disclosure, the belt body is provided so as to extend to the first harness and to the second harness along the back side of a user. Upon the actuator winding the belt body, tension acts on the belt body. The tension causes generation of an assist force for assisting the user's work, which reduces a burden on the body of the user. The belt body is light in weight and can conform to the body of the user even if the user changes his/her posture, and thus, follows movement of the user. Therefore, an assist device that provides good wear comfort can be provided.

Furthermore, with the assist device having the above configuration, when the user puts on the assist device, even though the belt body is loosened in advance, upon operation of the actuator being started, the belt body is automatically adjusted to a length according to the body size (for example, the body height) of the user. Then, upon the winding of the belt body being completed, the winding force is changed to a second winding force that is smaller than the first winding force. Since the second winding force is small, movement of the user is not hindered by the belt body after the user putting on the assist device. Since the belt body is adjusted to the length according to the body size of the user, it is possible to generate an assist force according to the body size of the user.

In the assist device according to the aspect of the present disclosure, the controller may configured to, upon the winding of the belt body being completed, change the winding force of the actuator to a second winding force that is smaller than the first winding force but is larger than zero. With the assist device according to the aspect of the present disclosure, even if the user makes small movements, for example, the user loses his/her posture, after putting on the assist device, the belt body is not easily loosened.

Also, in the assist device according to the aspect of the present disclosure, the actuator may include a pulley configured to wind the belt body, and a motor for making the pulley perform an operation of winding the belt body. The controller may be configured to, based on a parameter relating to rotation of the pulley or the motor, detect completion of the winding of the belt body. The assist device according to the aspect of the present disclosure enables completion of winding of the belt body to be detected with a simple configuration. Upon winding of the belt body being completed, the winding force of the actuator is changed from the first winding force to a second winding force.

Also, in the assist device according to the aspect of the present disclosure, the actuator may include a pulley configured to wind the belt body, and a motor for making the pulley perform an operation of winding the belt body. The controller may be configured to change the winding force of the actuator by decreasing a current supplied to the motor. The assist device according to the aspect of the present disclosure enables the winding force of the actuator winding the belt body to be changed from the first winding force to a second winding force that is smaller than the first winding force with a simple configuration.

An amount of winding of the belt body with the first winding force differs depending on the body height of the user. Therefore, in the assist device according to the aspect of the present disclosure, the actuator may include a pulley configured to wind the belt body, and a motor for making the pulley perform an operation of winding the belt body. The controller may be configured to, upon the winding force of the actuator being changed to the second winding force, set a phase of the motor at a time of the change, as an initial value of the phase of the motor. With the assist device according to the aspect of the present disclosure, initial setting of the phase of the motor is made according to the body size of the user. Based on the initial setting, control of rotation of the motor can be performed, enabling generation of a proper assist force.

Also, in the assist device according to the aspect of the present disclosure, the actuator may include a motor, a reducer section including a plurality of gears, the reducer section being configured to reduce rotation of the motor and output the resulting rotation, and a pulley configured to wind the belt body by rotating via the output of the reducer section. The actuator may be configured in such a manner that, when the belt body is unwound from the pulley, while the motor providing torque in a direction in which the belt body is wound, to the pulley through the reducer section, the pulley rotates in a direction in which the belt body is unwound. With the assist device according to the aspect of the present disclosure, even where the belt body is unwound from the pulley, the motor provides torque in the direction in which the belt body is wound to the pulley through the reducer section. In other words, tension acts on the belt body in each of a case where the belt body is wound and a case where the belt body is unwound. Then, regardless of a case where the belt body is wound or a case where the belt body is unwound, in the reducer section, a delay of response to generation of an assist force, the delay being caused by a backlash between the gears, and occurrence of an impact by the backlash can be prevented.

In the assist device, upon operation of the actuator being started in a state in which the first harness and the second harness is fitted to the user, winding of the belt body is performed with the first winding force. If the first winding force is large all the time, a force of impact transmitted from the belt body to the user at the time of completion of the winding may be large. Therefore, in the assist device according to the aspect of the present disclosure, the controller may be configured to, upon operation of the actuator being started, perform control to change the first winding force to be smaller than that at a start of the winding, in a time period that is later than the start of the winding. With the assist device according to the aspect of the present disclosure, the first winding force becomes smaller toward completion of the winding of the belt body. Therefore, it is possible to prevent an impact force from the belt body from being provided to the user when winding is completed.

Also, in the assist device according to the aspect of the present disclosure, the controller may be configured to, upon operation of the actuator being started, perform control to change a speed of winding of the belt body to be lower than that at a start of the winding, in a time period that is later than the start of the winding. With the assist device according to the aspect of the present disclosure, the speed of winding of the belt body becomes lower toward completion of the winding of the belt body. Therefore, it is possible to prevent an impact force from the belt body from being provided to the user when winding is completed.

The assist device according to the aspect of the present disclosure is light in weight, provides good wear comfort and enables generating an assist force according to the body size of a user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Configuration of Assist Device 10

Figure 1:
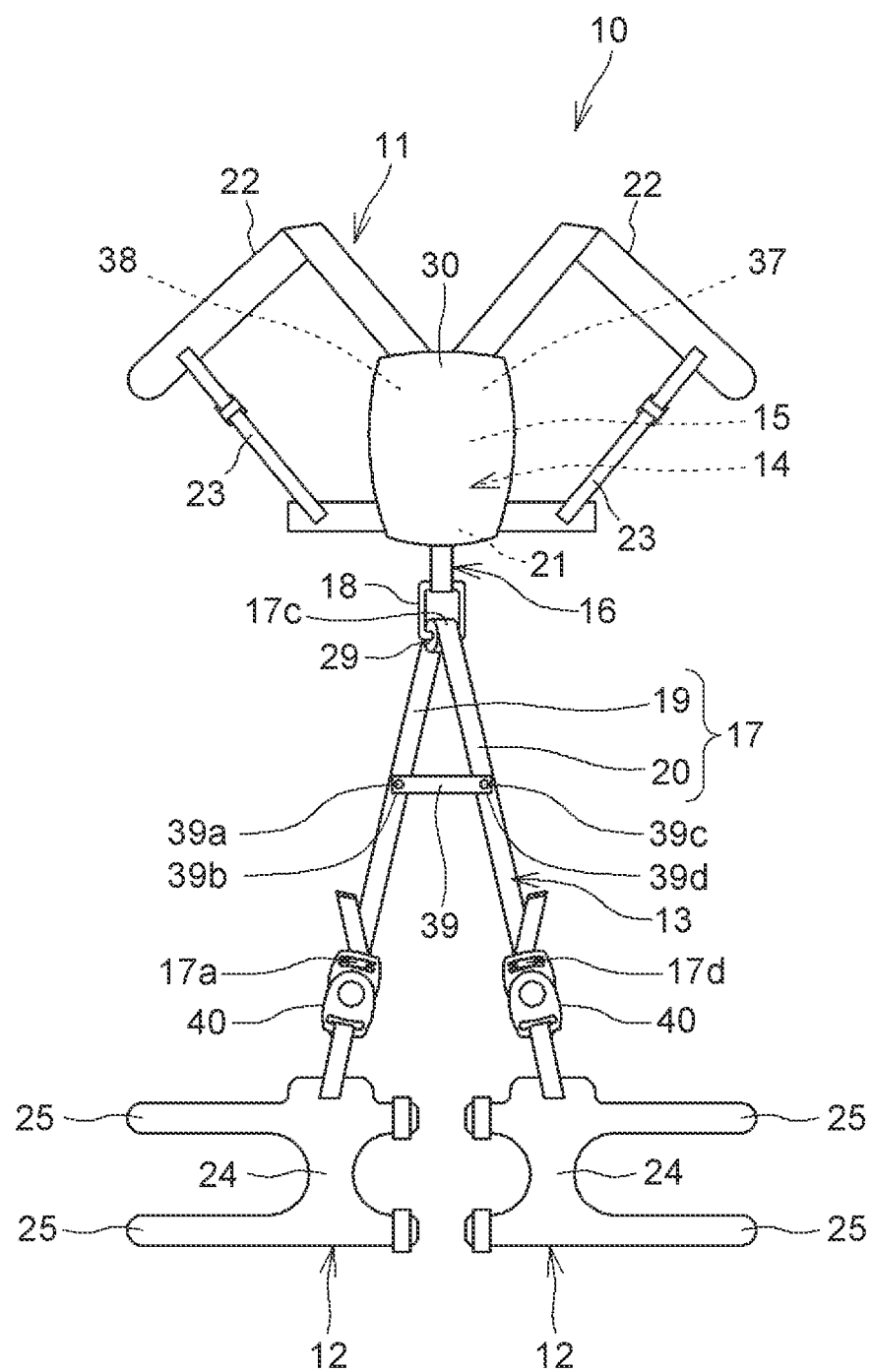
FIG. 1 is a back view illustrating an example of an assist device.
Figure 2:
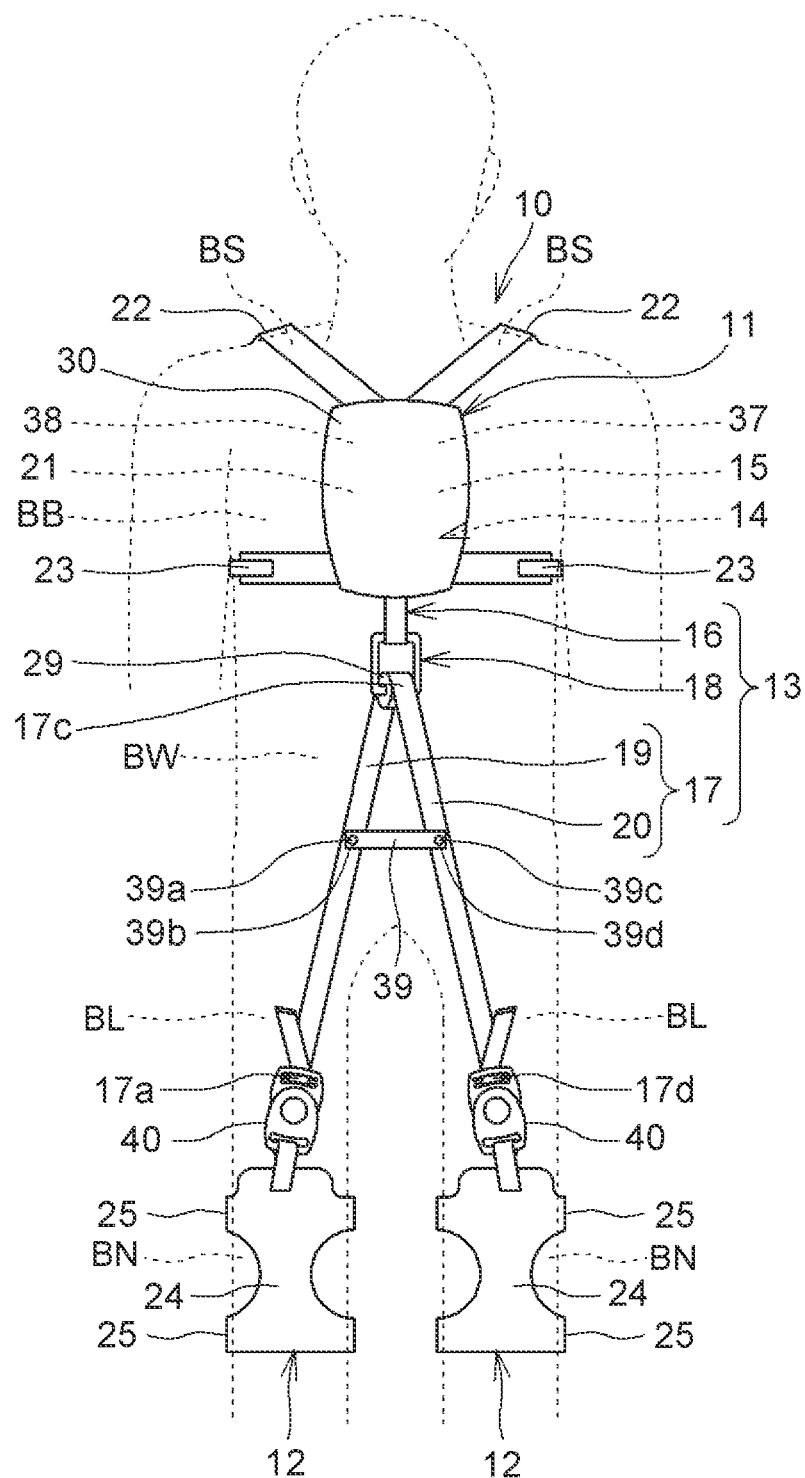
FIG. 2 is a back view of the assist device attached to the body of a user.
Figure 3:
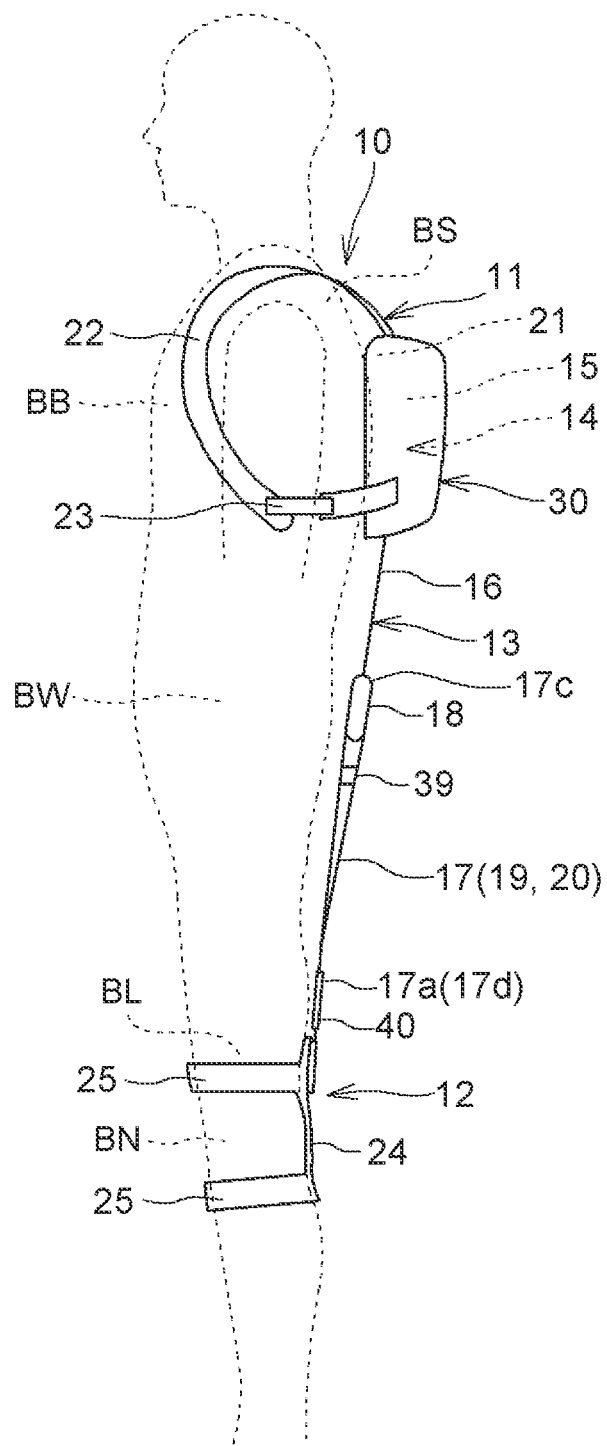
FIG. 3 is a side view of the assist device attached to the body of the user.
Figure 4:
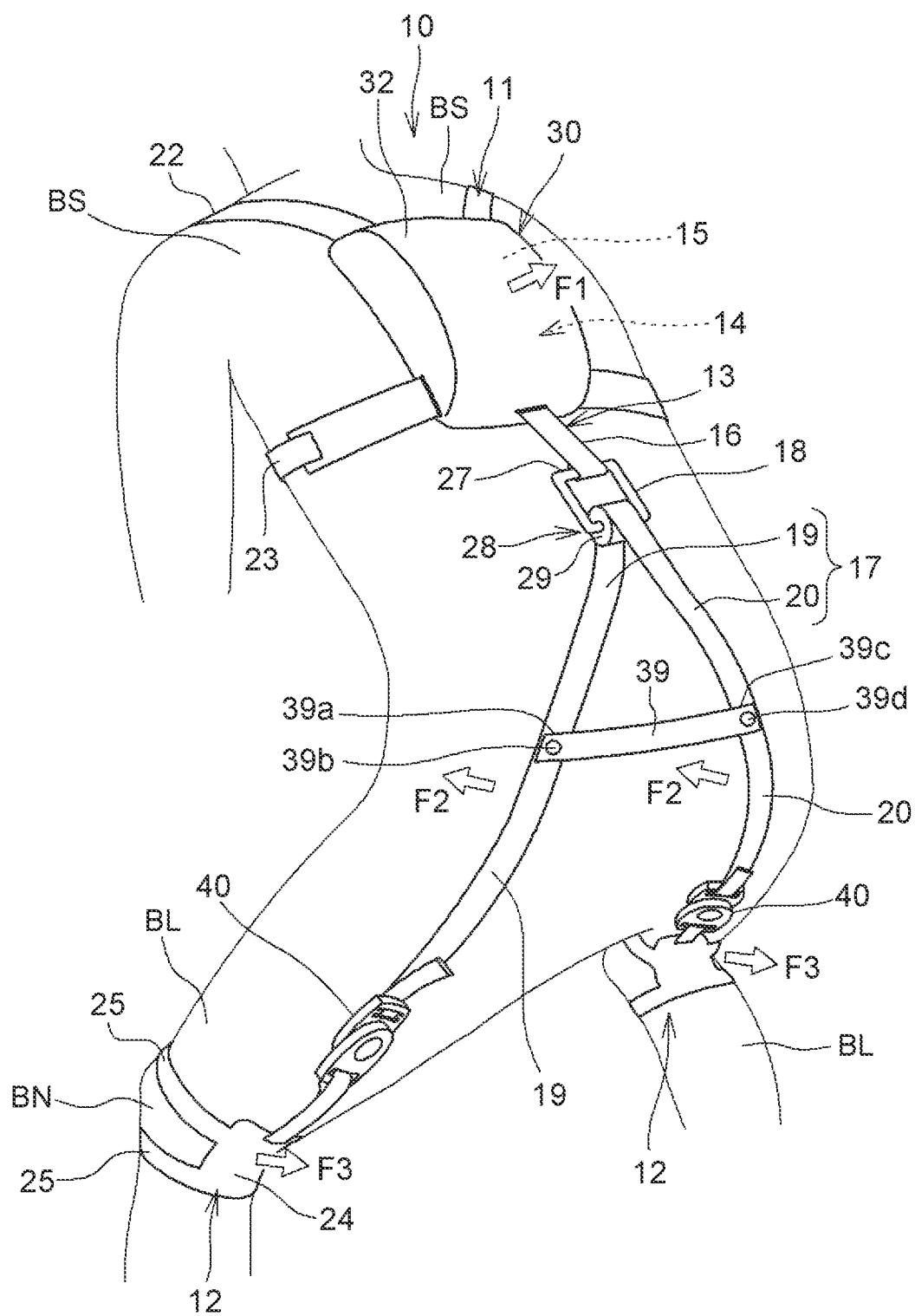
FIG. 4 is a diagram illustrating the user wearing the assist device in a forward-tilted posture.

FIG. 1 is a back view illustrating an example of an assist device. FIG. 2 is a back view of the assist device attached to the body of a user. FIG. 3 is a side view of the assist device attached to the body of the user. FIG. 4 is a diagram illustrating the user wearing the assist device having a forward-tilted posture (stooped posture). The assist device 10 illustrated in FIG. 1 includes one first harness 11 to be fitted to left and right shoulder regions BS, which are parts of the body of a user (human being), and two second harnesses 12 to be fitted to left and right leg regions BL, which are other parts of the body of the user. The first harness 11 only needs to be fitted to at least either the shoulder regions BS or a breast region BB of the user, and also, may have a form other than the illustrated form. In the present disclosure, the second harnesses 12 are fitted to respective knee regions BN in the leg regions BL. The second harnesses 12 also may have a form other than the illustrated form.

In the assist device 10 of the present disclosure, "left" and "right" are the user's own left and right when the user has an upright posture wearing the assist device 10 and "front" and "rear" are the user's own front and rear, "upper (up)" and "lower (down)" are the user's own upper and lower sides. "Upper (up)" are the head side of the user and "lower (down)" are the foot side of the user.

The assist device 10 includes a belt body 13, an actuator 14, a controller 15, a battery 37 and a sensor 38 in addition to the first harness 11 and the left and right second harnesses 12.

The first harness 11 is fitted to the shoulder region BS of the user. One second harness 12 is fitted to the left knee region BN of the user. The other second harness 12 is fitted to the right knee region BN of the user. The left second harness 12 and the right second harness 12 are bilaterally symmetrical and have a same configuration. The first harness 11 and the two second harnesses 12 are fitted to respective regions away from each other across a waist region BW, which is a joint of the user, that is, the shoulder regions BS and the leg regions BL.

The first harness 11 is formed of, e.g., flexible fabric. The first harness 11 includes a back body portion 21 to be fitted to the back of the user, and shoulder belts 22 and underarm belts 23 connecting with the back body portion 21. The shoulder belts 22 and the underarm belts 23 allow the back body portion 21 to be held on the back of the user. The underarm belts 23 connect the back body portion 21 and the respective shoulder belts 22 and are adjustable in length. By adjustment of the length of each underarm belt 23, the back body portion 21 is brought into close contact with the user. The first harness 11 is fitted to the shoulder regions BS so as to be incapable of moving forward and backward, leftward and rightward, and upward and downward. The first harness 11 may include a stiff member, for example, as a part to be hung on the shoulder regions BS.

The second harnesses 12 are each formed of, e.g., flexible fabric. Each second harness 12 includes a knee body portion 24 to be fitted to the rear side of the relevant knee region BN of the user, and knee belts 25 provided so as to extend from the knee body portion 24. The knee belts 25 extend around the knee region BN at respective positions above and below the knee region BN, and the distal end side of each knee belt 25 is fixed to the knee body portion 24. The knee belt 25 can be adjusted in length of wrapping of the knee region BN, by a locking member such as a belt and a buckle or a hook-and-loop fastener. By the adjustment, the knee body portion 24 is brought into a close contact with the rear side of the knee region BN. The second harnesses 12 are fitted to the knee regions BN so as to be incapable of moving forward and backward, leftward and rightward, and upward and downward.

The belt body 13 is provided along the back side of the user so as to connect the first harness 11 and the second harness 12. The belt body 13 includes a first belt 16 provided on the upper body side, a second belt 17 provided on the lower body side, and a joining member 18 joining the first belt 16 and the second belt 17. Each of the first belt 16 and the second belt 17 is long and flexible. The joining member 18 is made of a metal and is formed by a rectangular ring-like body called "rectangular ring".

Each of the first belt 16 and the second belt 17 is a band-like member made of fabric or leather and is bendable along a shape of the body. Note that each of the first belt 16 and the second belt 17 may be a string-like belt (wire-like member). Each of the first belt 16 and the second belt 17 of the present disclosure is a non-stretchable member, that is, has a characteristic of being hard to stretch in a longitudinal direction of the first belt 16 or the second belt 17 or a characteristic of not stretching in the longitudinal direction.

Figure 5:
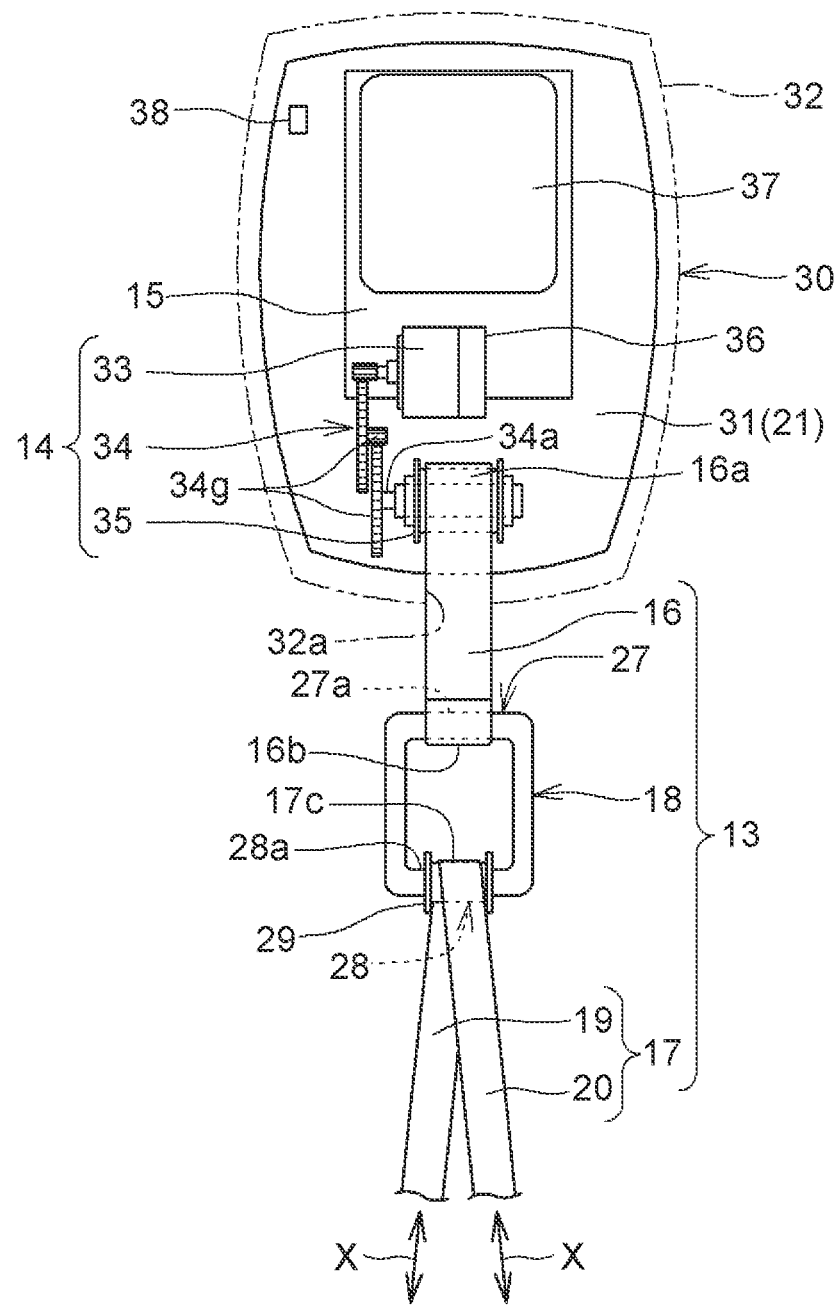
FIG. 5 is a diagram of a control box and a belt body.

The assist device 10 of the present disclosure includes a control box 30. The control box 30 is provided in the back body portion 21 of the first harness 11. FIG. 5 is a diagram of the control box 30 and the belt body 13. The control box 30 includes a base 31 having a plate-like shape and a cover 32 that covers the base 31. In order to describe an inner structure of the control box 30, in FIG. 5, the cover 32 is indicated by an imaginary line (alternate long and two short dashes line). The base 31 may be the back body portion 21 of the first harness 11.

The actuator 14, the controller 15, the battery 37, the sensor 38, etc., are provided in space between the base 31 and the cover 32. In the cover 32, an opening (cutout) 32a is formed and the first belt 16 extends through the opening 32a.

The actuator 14 is provided inside the control box 30. In other words, the actuator 14 is provided in the first harness 11. The actuator 14 enables winding and unwinding of a part of the belt body 13. For that purpose, the actuator 14 includes a motor 33, a reducer section 34 and a drive pulley 35. The motor 33 is a brushless DC motor. The motor 33 can rotate with a predetermined torque at a predetermined rotation frequency based on a drive signal output from the controller 15. The motor 33 can rotate in forward and reverse directions based on a drive signal output from the controller 15.

A parameter relating to rotation, such as a rotational angle, a rotation speed or a rotation frequency, of the motor 33 is detected by a rotation detector 36 attached to the motor 33. The rotation detector 36 of the present disclosure is a rotary encoder but may be a Hall sensor or a resolver. A result of detection by the rotation detector 36 is input to the controller 15. By the controller 15 controlling operation of the motor 33 based on the result of detection, the assist device 10 can generate a proper assist force.

The reducer section 34 is formed by a plurality of gears 34g, reduces the rotation frequency of the motor 33 and rotates an output shaft 34a of the reducer section 34. The drive pulley 35 is joined to the output shaft 34a and thus rotates together with the output shaft 34a. One end portion 16a side of the first belt 16 is attached to the drive pulley 35. Upon the drive pulley 35 rotating in one direction by forward rotation of the motor 33, the first belt 16 is wound on the drive pulley 35. Upon the drive pulley 35 rotating in the other direction by reverse rotation of the motor 33, the first belt 16 is unwound from the drive pulley 35.

As above, the actuator 14 includes the drive pulley 35 that can wind the belt body 13, and the motor 33 for making the drive pulley 35 perform an operation of winding the belt body 13. The first belt 16 is wound and unwound by the actuator 14.

The controller 15 is formed of a control unit including a microcomputer. The controller 15 controls operation of the actuator 14 (motor 33). As the sensor 38, an acceleration sensor is provided. A signal from the sensor 38 is input to the controller 15. The controller 15 can estimate a posture of the user based on the signal from the sensor 38. The battery 37 supplies electric power to the controller 15, the motor 33, the rotation detector 36 and the sensor 38. The sensor 38 may be provided outside the control box 30.

Belt Body 13

As described above, the belt body 13 includes a first belt 16, a second belt 17 and a joining member 18. One end portion 16a side of the first belt 16 is wound on the drive pulley 35 and is fixed. The other end portion 16b side of the first belt 16 is fixed to the joining member 18. Upon the first belt 16 being wound on the drive pulley 35, the joining member 18 is pulled up. Upon the joining member 18 being forcibly pulled down, the first belt 16 is unwound (pulled out) from the drive pulley 35. An amount of winding or unwinding (pullout) of the first belt 16 in the drive pulley 35 and an amount of rotation of an output shaft of the motor 33 are correlated with each other. A parameter relating to rotation of the motor 33 accompanying winding or unwinding of the belt body 13 is detected by the rotation detector 36.

As described above, the joining member 18 is formed by a rectangular ring-like body. A shaft portion 27a on one side (upper side) of the ring-like body is a first attachment portion 27, and the end portion 16b of the first belt 16 is attached to the first attachment portion 27. In the present disclosure, the first belt 16 is undetachable from the first attachment portion 27, but may be detachable by use of, e.g., a buckle.

The other side (lower side) of the rectangular ring-like body forming the joining member 18 is a second attachment portion 28 for attaching the second belt 17. As described above, the joining member 18 includes the first attachment portion 27 for attaching the first belt 16 and the second attachment portion 28 for attaching the second belt 17.

The second attachment portion 28 supports the second belt 17 in such a manner that the second belt 17 is folded at an intermediate point (intermediate portion 17c) of the second belt 17. The second attachment portion 28 of the present disclosure includes a shaft portion 28a integrated with the first attachment portion 27, and a rotary pulley 29 rotatably supported on the shaft portion 28a. The second belt 17 is hung on the rotary pulley 29 so as to be folded at an intermediate point of the second belt 17. This configuration provides a configuration in which the second belt 17 is not fixed to the second attachment portion 28 but the second belt 17 is supported so as to be movable in both directions in the longitudinal direction (arrow X directions in FIG. 5) in a state in which the second belt 17 is folded.

In FIG. 2, the second belt 17 is attached to the second harnesses 12. More specifically, the second belt 17 is formed of a single band-like member. One end portion 17a side of the second belt 17 is attached to the left second harness 12. The other end portion 17d side of the second belt 17 is attached to the right second harness 12. As above, the intermediate portion 17c of the second belt 17 is put on the joining member 18.

According to the above configuration of the second belt 17, the second belt 17 includes a left second belt portion 19 extending from the joining member 18 to the left second harness 12 and a right second belt portion 20 extending from the joining member 18 to the right second harness 12. As above (see FIG. 5), the second belt 17 is hung on the second attachment portion 28 (rotary pulley 29) and not fixed, a length of the left second belt portion 19 and a length of the right second belt portion 20 can freely be changed. However, a total of the length of the left second belt portion 19 and the length of the right second belt portion 20 is fixed. This configuration prevents, for example, walking of the user from being restricted by the second belt 17, and thus, enables the user to easily walk.

The second belt 17 further includes a connecting member 39 connecting the left second belt portion 19 and the right second belt portion 20. The connecting member 39 connects the left second belt portion 19 and the right second belt portion 20 at intermediate positions between the folded portion (intermediate portion 17c) of the second belt 17 and respective fixation parts of the two second harnesses 12 (one end portion 17a and the other end portion 17d). The folded portion is a part of the second belt 17, the part being folded at the joining member 18. The fixation portions are parts of the second belt 17, the parts being fixed to the two second harnesses 12, respectively.

For example, where the user changes his/her posture from an upright posture to a stooped posture as illustrated in FIG. 4, the connecting member 39 enables preventing an increase in lateral distance between the left second belt portion 19 and the right second belt portion 20. In other words, the connecting member 39 enables preventing a failure of the left second belt portion 19 and the right second belt portion 20 to extend along the respective back sides of the leg regions BL of the user.

Sensor 38 and Controller 15

In FIG. 5, as described above, the sensor 38 is formed by an acceleration sensor. The controller 15 can perform various types of arithmetic processing. By the controller 15 performing arithmetic processing of a signal from the sensor 38, a motion and a posture of the user can be detected. The sensor 38 has a configuration that outputs a signal according to a posture of the user, and thus functions as a posture detector for detecting a posture of the user. For example, it is possible to detect whether a posture of the upper body of the user is a forward-tilted posture or an upright posture or detect that the user has taken a crouching posture.

Also, an amount of winding and unwinding of the belt body 13 in the drive pulley 35 by the motor 33 and a posture of the user are correlated with each other. Therefore, the controller 15 can estimate a posture of the user based on a rotational angle of the motor 33 detected by the rotation detector 36. The rotation detector 36 functions as a posture detector for detecting a posture of the user.

The controller 15 processes a signal from one or each of both of the sensor 38 and the rotation detector 36, and outputs a drive signal to the actuator 14 (motor 33) based on a result of the processing, that is, the posture of the user. Based on the drive signal, the actuator 14 (motor 33) operates to, e.g., wind and unwind the belt body 13 and temporarily stop the winding and unwinding.

In a state in which the assist device 10 is worn by the user, based on the control by the controller 15, the motor 33 constantly operates in a direction in which the belt body 13 is wound, with a force (torque as a later-described second winding force) that is smaller than that of a case where the motor 33 generates an assist force, to cause generation of small tension in the belt body 13. Consequently, the belt body 13 is not loosened.

Upon the user changing his/her posture, for example, from an upright posture to a forward-tilted posture, tension is generated in the belt body 13 because of the posture change. Therefore, in this case, upon a start of a posture change to a forward-tilted posture, the motor 33 is forcibly rotated (the motor 33 idles) by the tension of the belt body 13 irrespective of power of the actuator 14, and the belt body 13 is thereby unwound. Alternatively, upon a start of a posture change to a forward-tilted posture, the actuator 14 operates, that is, the motor 33 is driven to rotate to unwind the belt body 13.

On the other hand, upon the user changing his/her posture from a forward-tilted posture to an upright posture, the belt body 13 is about to be loosened because of the posture change. Therefore, in this case, upon a start of the posture change to an upright posture, in order to maintain tension acting on the belt body 13, the actuator 14 operates, that is, the motor 33 is driven to rotate, to wind the belt body 13.

In this way, by the user's posture change, the belt body 13 is wound or unwound. In the winding or the unwinding, the motor 33 actively or passively rotate by a predetermined rotational angle. The rotational angle at this time is detected by the rotation detector 36. In this way, an amount of operation of the actuator 14 (motor 33) in winding or unwinding of the belt body 13 due to the user's posture change is detected by the rotation detector 36. Then, the controller 15 acquires the amount of operation of the actuator 14 (rotational angle of the motor 33) in winding or unwinding of the belt body 13 due to the user's posture change, and based on the amount of operation, performs control of operation of the actuator 14 in order to provide an assist force to the user.

Figure 6:
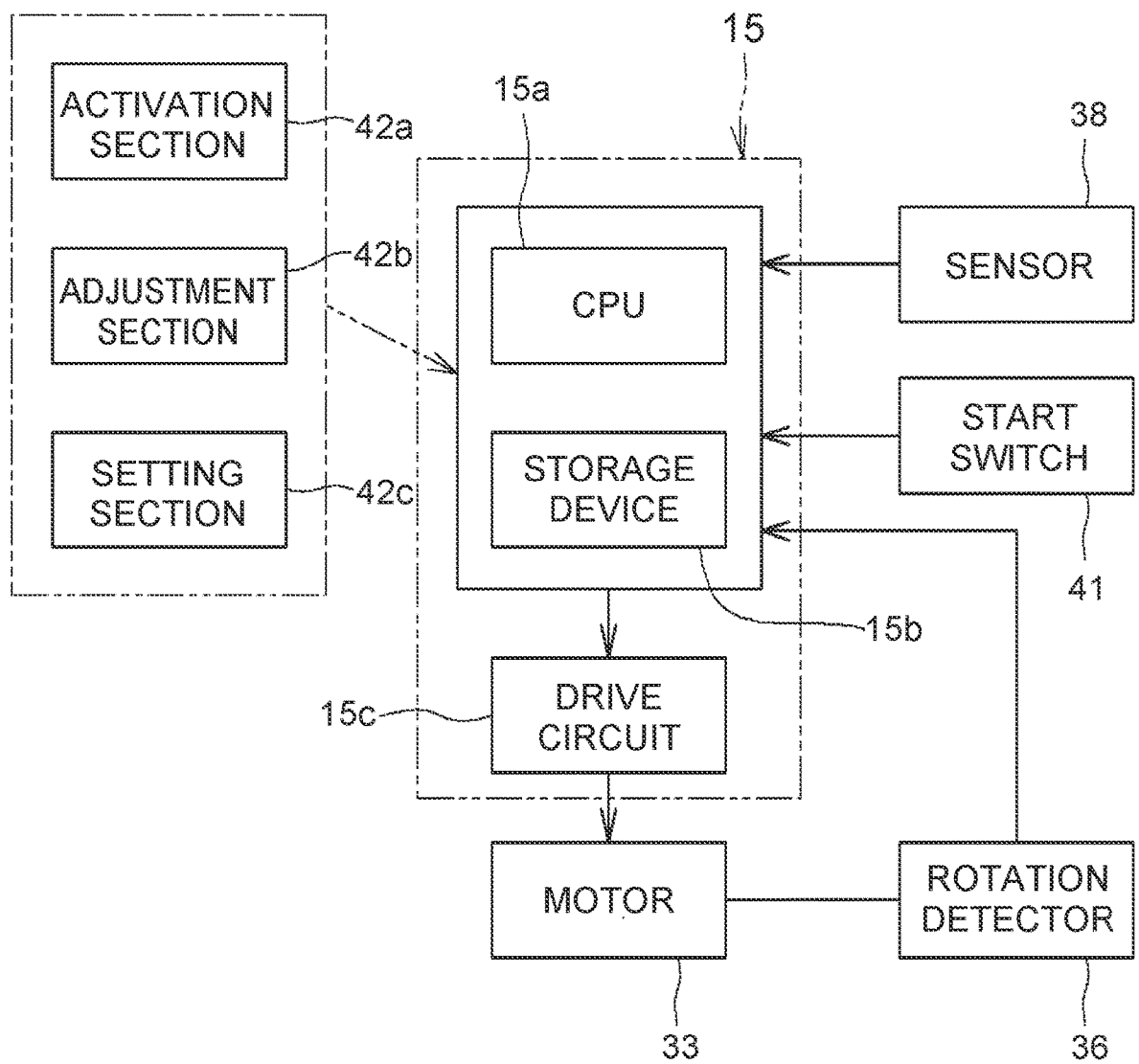
FIG. 6 is a block diagram illustrating a control configuration included in the assist device.

FIG. 6 is a block diagram illustrating a control configuration included in the assist device 10. The controller 15 is formed by a control unit including a microcomputer and includes an arithmetic processing unit (CPU) 15a and a storage device (storage section) 15b such as a memory. The arithmetic processing unit 15a performs various types of arithmetic processing based on various programs, various parameters, etc., stored in the storage device 15b. The controller 15 of the present disclosure includes an activation section 42a, an adjustment section 42b and a setting section 42c as functional sections implemented via arithmetic processing by the arithmetic processing unit 15a. The controller 15 further includes a drive circuit (motor driver) 15c that performs operation control of the motor 33. The motor 33 performs predetermined operations via cooperation between the respective functional sections and the drive circuit 15c.

In a state in which the assist device 10 is worn by the user, upon a start switch 41 being turned on, the controller 15 performs initial setting processing. Note that the start switch 41 is provided in, e.g., the control box 30 (see FIG. 1) or a shoulder belt 22 and is operated by the user. The start switch 41 is a switch for starting and stopping the assist device 10.

The activation section 42a activates the actuator 14 to start winding of the belt body 13. In other words, the activation section 42a makes the motor 33 rotate to wind the belt body 13 on the drive pulley 35.

The adjustment section 42b adjusts a force of winding the belt body 13. The force of winding the belt body 13 is generated based on rotation torque for the drive pulley 35, and the rotation torque is generated based on output torque of the motor 33. Therefore, in order to adjust the force of winding the belt body 13, the adjustment section 42b controls the drive circuit 15c to change the output torque of the motor 33. The adjustment section 42b can decrease the output torque of the motor 33 by decreasing a current supplied to the motor 33. In other words, as described later, a decrease of the current supplied to the motor 33 results in a change of the winding force of the actuator 14 to a second winding force that is smaller than a first winding force. Also, the adjustment section 42b can increase the output torque of the motor 33 by increasing the current supplied to the motor 33.

Upon the user putting on the assist device 10, winding of the belt body 13 is started by the activation section 42a. As also described later, in order to provide an assist force to the user who performs work, the motor 33 is rotated from a state in which the belt body 13 is not loosened, that is, a state in which winding of the belt body 13 on the drive pulley 35 is completed, to perform winding and unwinding of the belt body 13. Note that the state in which winding of the belt body 13 on the drive pulley 35 is completed is an "initial state". An amount of winding of the belt body 13 and an amount of unwinding of the belt body 13 change according to an amount of rotation of the motor 33 from the initial state. Tension acting on the belt body 13 and a time during which the tension acts are adjusted according to the change, and an assist force according to the tension and the time is generated.

In other words, the amount of rotation of the motor 33 from the initial state affects the assist force. In order to control an amount of rotation of the motor 33, it is important to set an initial value of a phase of the motor 33. Then, an amount of winding by the activation section 42a until completion of the winding such as above varies depending on the body size (body height) of the user. In other words, an amount of rotation of the motor 33 until completion of winding varies depending on the user. Therefore, although a specific example will be described later, in initial setting processing, an initial value of a phase of the motor 33 is set by the setting section 42c.

Initial Setting Processing

Figure 7:
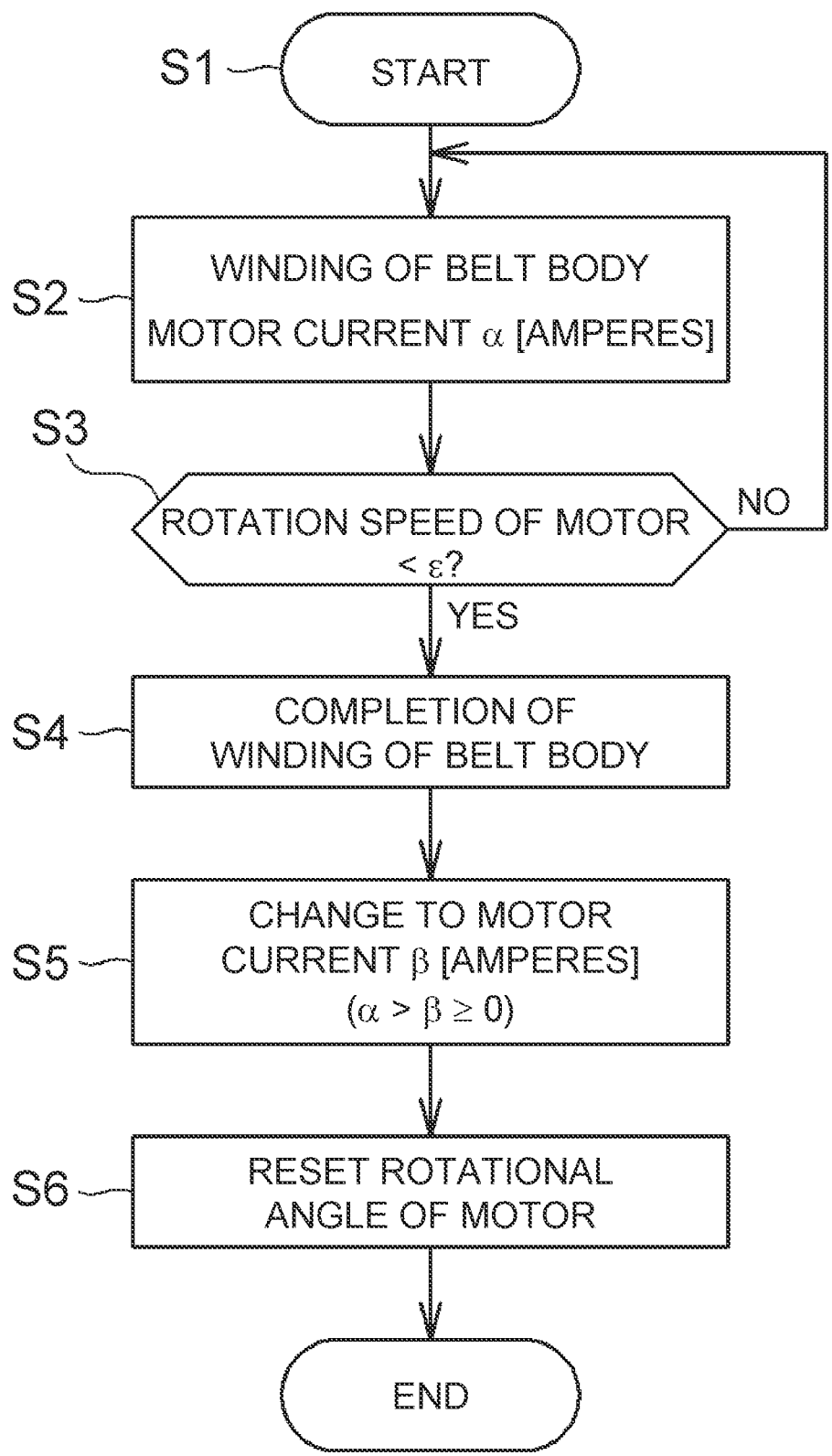
FIG. 7 is a flowchart illustrating initial setting processing.

Initial setting processing by the functional sections included in the controller 15 will be described with reference to FIGS. 6 and 7. FIG. 7 is a flowchart illustrating initial setting processing. After initial setting processing being performed, the assist device 10 generates an assist force according to actual movement (work) of a user. Generation of an assist force will be described later.

Upon the first harness 11 and the second harnesses 12 of the assist device 10 (see FIGS. 1 and 2) being fitted to predetermined parts of the body of a user, initial setting processing is started (step S1 in FIG. 7). Note that in order to fit the first harness 11 and the second harnesses 12 to the user, the belt body 13 is drawn out in advance from the drive pulley 35 and the belt body 13 is thus in a loosened state.

The user with the first harness 11 and the second harnesses 12 fitted is in an upright posture. Upon the start switch 41 being switched from an off state to an on state by, e.g., the user, the activation section 42a activates the actuator 14 to start winding of the belt body 13 (step S2 in FIG. 7). In other words, the motor 33 rotates and the belt body 13 is wound on the drive pulley 35. From the start of rotation of the motor 33, the belt body 13 is wound with a first winding force. A value of a current supplied to the motor 33 in order to generate the first winding force is $\alpha$ [amperes].

The adjustment section 42b constantly acquires a detection signal from the rotation detector 36 and compares a detection value of a rotation speed (parameter relating to rotation) of the motor 33 and a threshold value e of the parameter (step S3 in FIG. 7). During a time of the detection value being equal to or larger than the threshold value c, the value of the current supplied to the motor 33 is $\alpha$ [amperes] and the winding of the belt body 13 with the first winding force is continued.

When the detection value becomes smaller than the threshold value $\varepsilon$ (Yes in step S3 in FIG. 7), the adjustment section 42b estimates that the winding of the belt body 13 is completed (step S4 in FIG. 7). When the detection value becomes smaller than the threshold value ε, the adjustment section 42b changes the value of the current supplied to the motor 33 to β [amperes] (step S5 in FIG. 7). β [amperes], which is a current value after the change, is equal to or smaller than α [amperes], which is a current value before the change, and in the present embodiment, is smaller than α [amperes] (β<α). Note that β [amperes] only needs to be equal to or larger than zero, and the present embodiment, is a value larger than zero.

Consequently, the force of winding the belt body 13 by the actuator 14 is changed to a second winding force. The second winding force after the change is equal to or smaller than the first winding force, and in the present embodiment, is smaller than the first winding force. The second winding force is a winding force that does not hinder movement of the user by tension acting on the belt body 13 but generates tension of a degree that enables the user to freely move, in the belt body 13. Here, it is sufficient that the belt body 13 is provided with tension even where the user has an upright posture and the second winding force is zero. Where β=0, the second winding force is zero. In this way, the adjustment section 42b changes the force of winding the belt body 13 by the actuator 14 to the second winding force that is smaller than the first winding force by decreasing the value of the current supplied to the motor 33.

A timing for changing the winding force is a timing when loosening of the belt body 13 has been eliminated. As described above, such timing is detected by the rotation detector 36 based on the parameter relating to rotation of the motor 33. In other words, upon the first harness 11 and the second harnesses 12 being fitted to the user, the motor 33 rotates the drive pulley 35 and the belt body 13 in a loosened state is wound on the drive pulley 35 with the first winding force. Consequently, the loosening of the belt body 13 is eliminated. Then, the drive pulley 35 becomes unable to rotate, a rotation speed of the drive pulley 35 becomes lower, and finally, the rotation stops. Along with that, the rotation speed of the motor 33 also becomes lower, and finally, the rotation stops. This state is a state in which the winding of the belt body 13 is completed. Therefore, the rotation detector 36 detects a timing when the rotation speed (parameter relating to rotation) of the motor 33 has changed. In other words, a timing when the rotation detector 36 has detected that the rotation speed becomes lower than the threshold value e is determined as a timing for changing the winding force.

Note that in the present disclosure, rotation of the motor 33 is detected by the rotation detector 36, and based on the detection, processing for changing a winding force is performed. However, rotation of the drive pulley 35 may be detected by a (non-illustrated) rotation detector, and based on the detection, processing for changing a winding force may be performed. In other words, the adjustment section 42b may detect (estimate) completion of winding of the belt body 13 based on a parameter relating to rotation (for example, a rotation speed) of the motor 33 or the drive pulley 35. Then, the winding force is changed.

Upon the winding force of the belt body 13 being changed to the second winding force as described above, the setting section 42c sets an initial value of a phase (rotational angle) of the motor 33 (step S6 in FIG. 7). In the present disclosure, a phase (rotational angle) of an output shaft of the motor 33 at the time when the winding force changed as described above is set to "zero" as an initial value (that is, is reset).

Upon the initial value being set, subsequently, an amount of rotation of the motor 33 is controlled based on the initial value. Consequently, in order to generate an assist force, a correct amount of rotation of the motor 33 is managed. The amount of rotation of the motor 33 corresponds to an amount of winding of the belt body 13 on the drive pulley 35 and an amount of unwinding of the belt body 13 from the drive pulley 35. An amount of winding of the belt body 13 is correlated with a magnitude of tension acting on the belt body 13 and a time during which the tension acts, and as described later, tension of the belt body 13 causes generation of an assist force. Therefore, correct management of an amount of rotation of the motor 33 enables generation of a desired assist force.

Change and Adjustment of First Winding Force (Speed of Winding of Belt Body 13)

As described above, in initial setting processing, upon operation of the motor 33 included in the actuator 14 being started in a state in which the first harness 11 and the second harnesses 12 are fitted to a user, winding of the belt body 13 is performed with a first winding force. The force of winding the belt body 13 is generated based on rotation torque for the drive pulley 35 included in the actuator 14 and the rotation torque is generated based on output torque of the motor 33. Therefore, the adjustment section 42b included in the controller 15 has a function that adjusts the force of winding the belt body 13. More specifically, the adjustment section 42b changes the force of winding the belt body 13, that is, the output torque of the motor 33 by performing control to change a current supplied to the motor 33.

In the above description of the initial setting processing, a value of current supplied to the motor 33 in order to generate a first winding force is α [amperes]. Note that upon completion of winding of the belt body 13, the adjustment section 42b changes the value of the current supplied to the motor 33 to β [amperes] (however, β<α).

Here, in the initial setting processing, if the first winding force is large all the time, a force of impact transmitted from the belt body 13 to the user at the time of completion of the winding may be large. Therefore, the adjustment section 42b performs control to, upon operation of the motor 33 being started in a state in which the first harness 11 and the second harnesses 12 are fitted to the user, change the first winding force to be smaller.

Figure 10A:
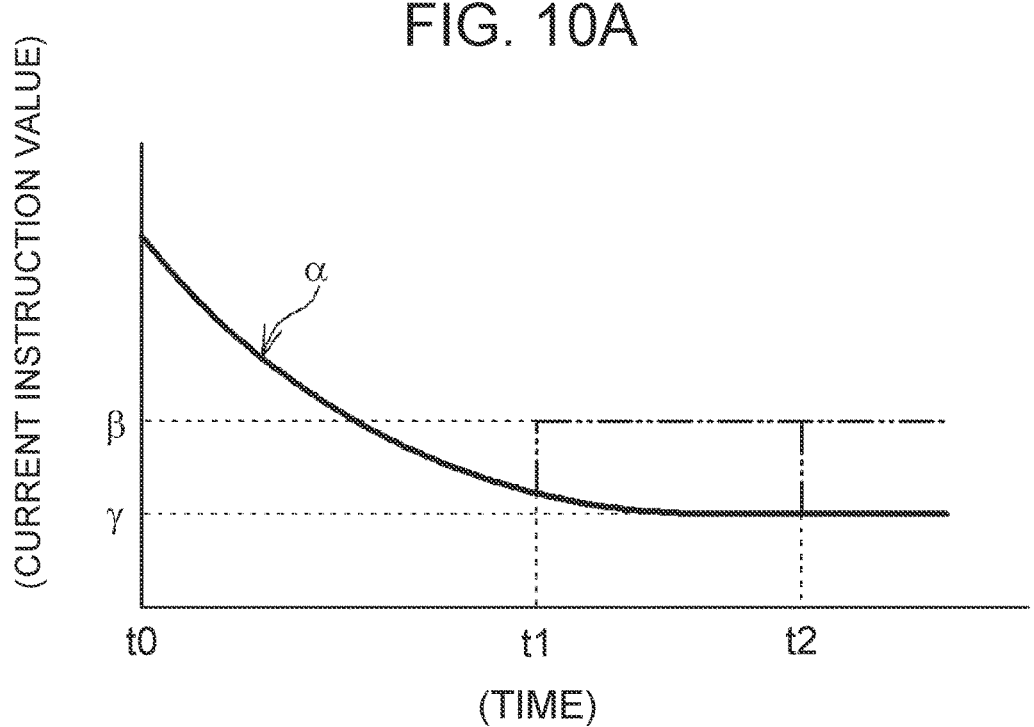
FIG. 10A is a graph illustrating temporal change of a current value of a current supplied to a motor, by a function of an adjustment section.
Figure 10B:
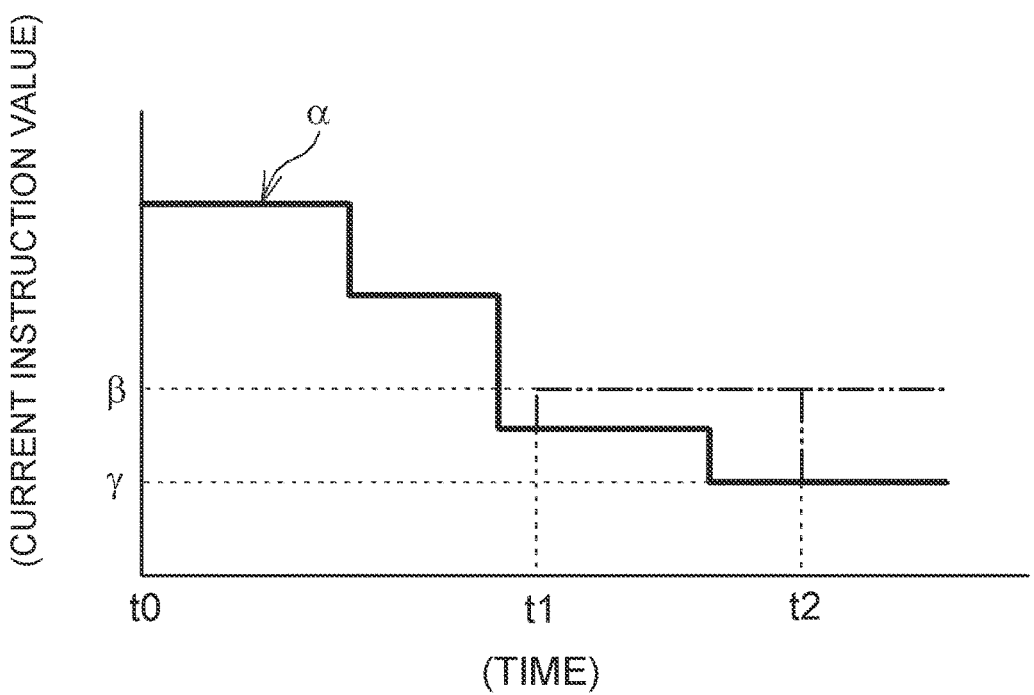
FIG. 10B is a graph illustrating temporal change of a current value of a current supplied to the motor, by a function of the adjustment section.

In order to achieve this control, the adjustment section 42b changes the value of the current supplied to the motor 33 (current instruction value). In other words, the current instruction value α [amperes] is variable. Each of FIGS. 10A and 10B is a graph illustrating temporal change of a value of a current supplied to the motor 33, by a function of the adjustment section 42b. In the mode illustrated in FIG. 10A, control to gradually lower a current instruction value from a start of rotation of the motor 33 (time t0) is performed by the adjustment section 42b. Also, as an alteration of the control, as illustrated FIG. 10B, control to lower a current instruction value in a stepwise manner from a start of rotation of the motor 33 (time t0) may be performed. As illustrated in FIGS. 10A and 10B, the adjustment section 42b performs control to change a first winding force to be smaller than that at a start of the winding, in a time period that is later than the start of the winding.

In each of the modes illustrated in FIGS. 10A and 10B, the current instruction value is set (programmed) so as to finally approach γ [amperes]. Upon detection of completion of winding of the belt body 13 at a point of time during the current instruction value approaching γ [amperes] (for example, a time t1) or at a point of time when the current instruction value has approached γ [amperes] and then become constant (for example, a time t2), the adjustment section 42b subsequently changes the current instruction value to β [amperes]. Consequently, the force of winding the belt body 13 is changed to a second winding force that is smaller than an initial value of the first winding force. As illustrated in FIG. 10A (FIG. 10B), the current instruction value β may be larger than the current instruction value γ; however, β may be smaller than γ or β may be equal to γ.

Figure 11A:
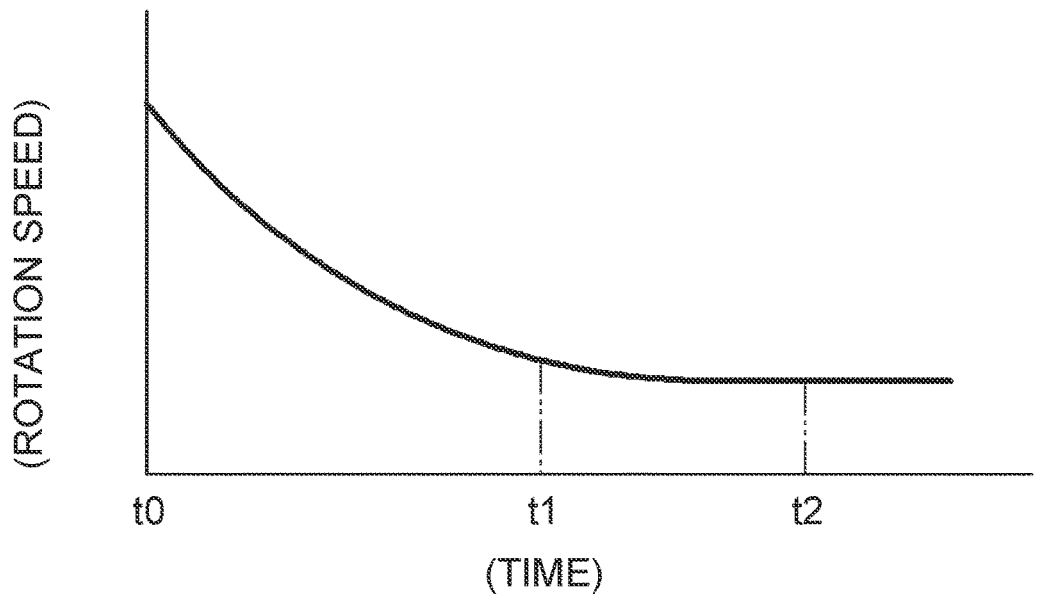
FIG. 11A is a graph illustrating temporal change of a rotation speed of the motor, by a function of the adjustment section.
Figure 11B:
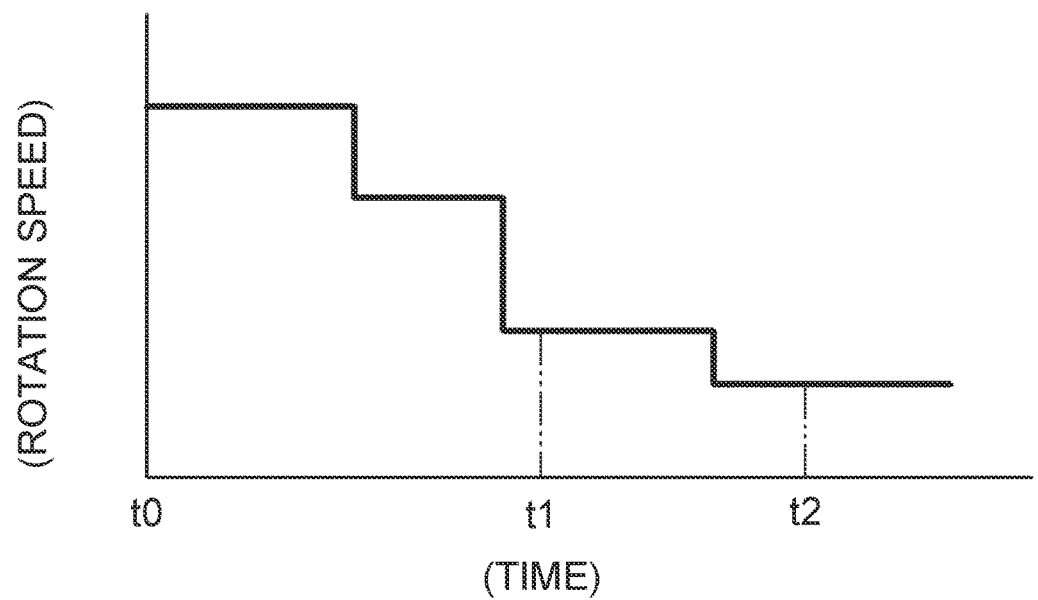
FIG. 11B is a graph illustrating temporal change of a rotation speed of the motor, by a function of the adjustment section.

From another perspective, the adjustment section 42b may have a function that adjusts a speed of winding of the belt body 13. In other words, the adjustment section 42b may perform control to change a rotation speed of the motor 33. Each of FIGS. 11A and 11B is a graph illustrating temporal change of a rotation speed of the motor 33 by a function of the adjustment section 42b. In the mode illustrated in FIG. 11A, control to gradually lower the rotation speed from a start of rotation of the motor 33 (time t0) is performed by the adjustment section 42b. As an alteration of the control, as illustrated in FIG. 11B, control to lower the rotation speed in a stepwise manner from a start of rotation of the motor 33 (time t0) may be performed.

In each of the modes illustrated in FIGS. 11A and 11B, the adjustment section 42b performs control to, upon operation of the motor 33 of the actuator 14 being started in a state in which the first harness 11 and the second harnesses 12 are fitted to a user, change a speed of winding of the belt body 13 to be lower. More specifically, the adjustment section 42b performs control to change the speed of winding of the belt body 13 to be lower than that at a start of the winding, in a time period that is later than the start of the winding. Then, upon completion of the winding of the belt body 13 (detection of completion of the winding), the speed of winding of the belt body 13 becomes zero.

In the above initial setting processing, upon operation of the motor 33 being started, the force of winding of the belt body 13 is relatively large and the speed of winding of the belt body 13 is relatively high. Therefore, the belt body 13 is automatically adjusted to a length according to the body size (for example, the body height) of the user, and in addition, the processing is quickly performed. Then, as a result of the control illustrated in FIG. 10A or 10B being performed, the first winding force of the belt body 13 becomes smaller toward completion of the winding. Also, as a result of the control illustrated in FIG. 11A or 11B being performed, the speed of winding of the belt body 13 becomes lower toward completion of the winding of the belt body 13. According to the above, it is possible to prevent an impact force from the belt body 13 from being provided to the user when winding is completed.

Assist Force of Assist Device 10

Figure 8:
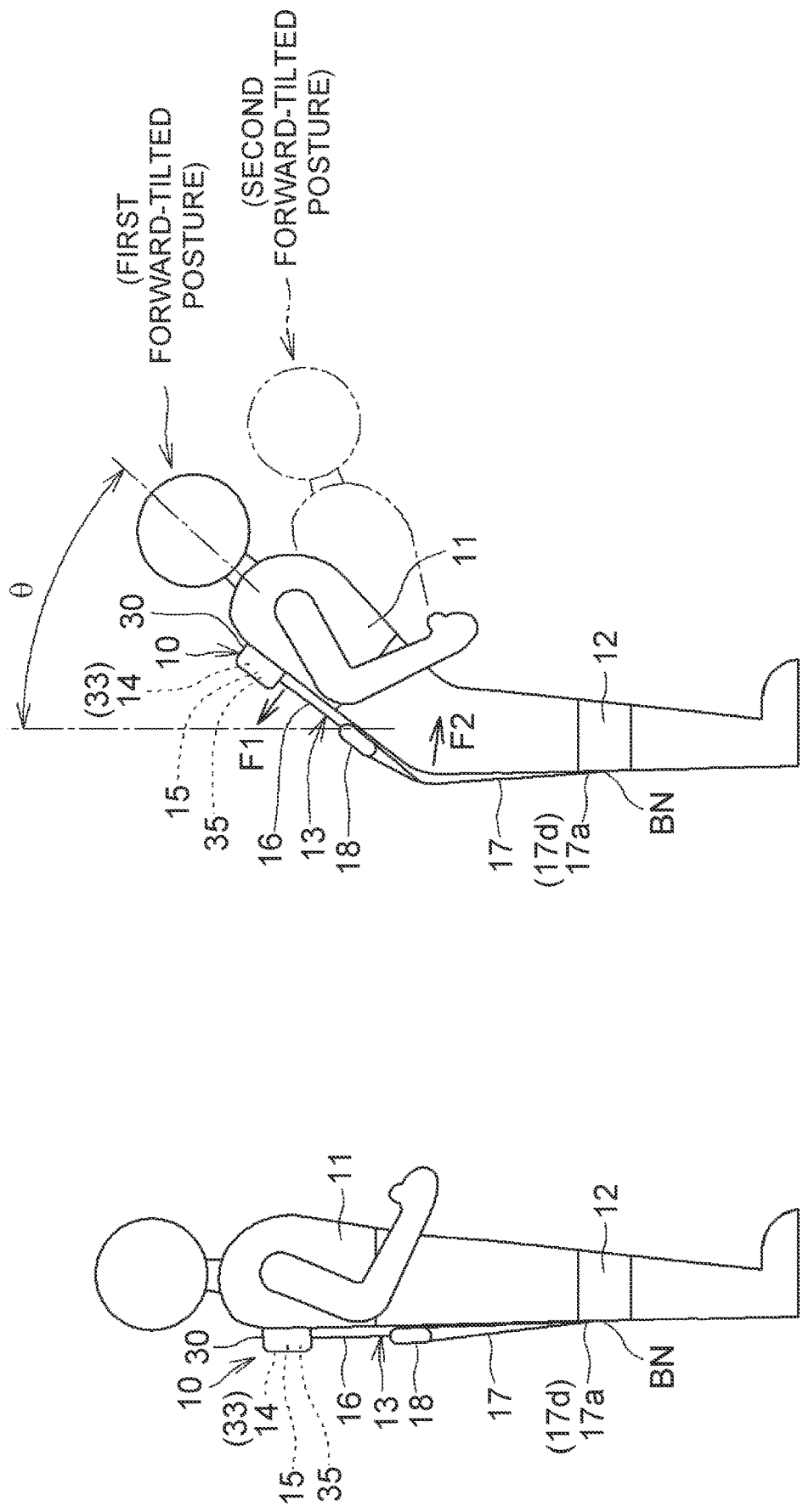
FIG. 8 is a diagram of a case where a user wearing an assist device changes his/her posture.

FIG. 8 is a diagram of a case where the user wearing the assist device 10 changes his/her posture. The assist device 10 can provide an assist force to the user for the posture change.

Upon the initial setting processing being completed and the first belt 16 being thus wound on the drive pulley 35 by the motor 33 of the actuator 14, the joining member 18 pulls the second belt 17 up toward the actuator 14 side, that is, the upper side. The opposite end portions 17a, 17d of the second belt 17 are attached to the left and right second harnesses 12, respectively. The second harnesses 12 are fixed to the respective knee regions BN. Therefore, upon the first belt 16 being wound on the drive pulley 35, tension acts on the first belt 16 and the second belt 17. The tension acts as an assist force for the user.

A case where the user changes his/her posture from an upright posture to a forward-tilted posture will be described. Upon a start of the posture change to a forward-tilted posture, the actuator 14 unwinds the belt body 13. Alternatively, the belt body 13 is unwound irrespective of power of the actuator 14. Consequently, the user can effortlessly take a forward-tilted posture. Upon a forward-tilting angle of the upper body of the user relative to a vertical line reaching θ and the user stopping at the tilting angle of θ, the unwinding of the belt body 13 is stopped. Note that a start and an end of a posture change can be detected by the rotation detector 36 or the sensor 38.

Upon the user starting to change his/her posture in a direction from a forward-tilted posture to an upright posture, the actuator 14 winds the belt body 13. Consequently, tension is generated in the belt body 13. The tension causes generation of a rearward acting force F1 in the first harness 11. In other words, an acting force F1 is generated in a direction in which the upper body of the user having a forward-tilted posture is raised. Also, simultaneously, in the second belt 17, an acting force F2 pushing a left hip region and a right hip region of the user forward is generated by the tension. Consequently, the user can easily return from the forward-tilted posture to an upright posture.

Also, as illustrated in FIG. 4, where the user takes a bent posture (crouching posture) in which the upper body is tilted forward and the knee regions are bent, the assist device 10 can provide an assist force to the user. Where the user changes his/her posture from a bent posture to an upright posture, for example, where the user lifts up an object or a part of the body of a care-receiver, the actuator 14 winds the belt body 13. Consequently, tension is generated in the belt body 13.

The tension causes generation of a rearward acting force F1 in the first harness 11. In other words, an acting force F1 in a direction in which the upper body of the user having a forward-tilted posture is raised is generated. Also, simultaneously, in the second belt 17, an acting force F2 pushing the left hip region and the right hip region of the user forward is generated by the tension. Furthermore, a rearward acting force F3 is generated in the second harnesses 12. The above acting forces F1, F2, F3 reduce a load on muscles such as the back muscle, the quadriceps, etc., of the user having a stooped posture and thus enables assisting a motion of lifting up a load.

The assist device 10 also functions where the user changes his/her posture from an upright posture into a bent posture, for example, where the user lifts down an object or a part of the body of a care-receiver. In this case, the actuator 14 unwinds the belt body 13 while exerting a braking force for the unwinding of the belt body 13. In other words, the motor 33 rotates in a direction in which the belt body 13 is unwound, but torque in the winding direction is generated in the motor 33. Consequently, tension is generated in the belt body 13. In this case, also, the assist device 10 enables reducing a load on muscles such the back muscle, the quadriceps, etc., of the user in a stooped posture and thus enabling assisting a lift-down motion by means of the above acting forces F1, F2, F3. As above, the assist device 10 of the present disclosure enables reducing a load on the muscles of the waist region in a stooped posture and preventing lower back pain.

Also, according to the assist device 10 of the present disclosure, even if the user has a bent posture with one of the left and right leg regions BL on the front side and the other on the rear side (in a laterally asymmetrical state), one (on the side on which the leg region is put forward) of the left second belt portion 19 and the right second belt portion 20 of the second belt 17 can automatically become longer than the other. Upon the first belt 16 being wound by the actuator 14 in this state, tension also acts on the second belt 17, and the tension acts on both of the left second belt portion 19 and the right second belt portion 20 and thus the tension is not relieved. Therefore, as described above, even if the user has a laterally asymmetrical posture, the assist device 10 of the present disclosure enables a proper assist force to act on the user.

Where the user maintains a forward-tilted posture, also, the assist device 10 of the present disclosure enables easily maintaining the posture. In other words, as illustrated in the figure on the right side of FIG. 8, in a state in which the user has taken a first forward-tilted posture, the operation of the actuator 14 stops to prevent unwinding of the belt body 13. Even if the user attempts to take a further forward-tilted posture (second forward-tilted posture), tension of the belt body 13 connecting the first harness 11 and the second harnesses 12 prevents taking the second forward-tilted posture. In other words, the assist device 10 attempts to maintain the first forward-tilted posture of the user. For the user, it is easy to maintain the first forward-tilted posture. As a result, for example, where the user continues having the first forward-tilted posture for a long time for work, a load on the body can be reduced.

Assist Device 10 of the Present Disclosure

As above, the assist device 10 of the present disclosure (see FIG. 2) includes the first harness 11 to be fitted to shoulder regions BS of a user, the second harnesses 12 to be fitted to left and right leg regions BL of the user, respectively, the belt body 13, and the actuator 14. The belt body 13 is provided so as to extend to the first harness 11 and to the second harnesses 12 along the back side of the user. The actuator 14 is provided in the first harness 11 and is configured to be capable of winding and unwinding a part of the belt body 13.

The belt body 13 includes the first belt 16 to be wound and unwound by the actuator 14, the second belt 17 attached to the second harnesses 12, and the joining member 18 joining the first belt 16 and the second belt 17.

According to this assist device 10, the belt body 13 is provided so as to extend to the first harness 11 and to the second harnesses 12 along the back side of a user. By the actuator 14 winding the belt body 13 (first belt 16), tension acts on the first belt 16 and the second belt 17. The tension causes generation of an assist force for assisting the user's work, which reduces a burden on the body of the user.

For example, when a user (caregiver) changes his/her posture from a forward-tilted posture to an upright posture while holding a load (care-receiver) with his/her hands (see FIG. 8), tension acts on the belt body 13 by the actuator 14 winding the belt body 13. The tension makes it easy for the user to change his/her posture from a forward-tilted posture to an upright posture and thus reduces a burden on the body of the user. In other words, tension acting on the belt body 13 is generated by the actuator 14 as an assist force.

The assist device 10 of the present disclosure includes the controller 15 that performs operation control of the actuator 14 in order to perform initial setting processing in such a manner as described above and to provide an assist force to a user. For initial setting processing, the controller 15 performs the following operation control. In other words, upon operation of the actuator 14 being started in a state in which the first harness 11 and the second harnesses 12 are fitted to a user, winding of the belt body 13 is performed with a first winding force. Upon completion of the winding of the belt body 13, the winding force of the actuator 14 is changed to a second winding force that is smaller than the first winding force.

According to this initial setting processing, when the user puts on the assist device 10, even though the belt body 13 is loosened in advance, upon operation of the actuator 14 being started, the belt body 13 is automatically adjusted to a length according to the body size (for example, the body height) of the user. Then, upon completion of the winding of the belt body 13, the force of winding the belt body 13 is changed to the second winding force that is smaller than the first winding force. Since the second winding force is small, movement of the user is not hindered by the belt body 13 after the user putting on the assist device 10. Since the belt body 13 is adjusted to the length according to the body size of the user, it is possible to generate an assist force according to the body size of the user.

According to the present disclosure, in initial setting processing, upon completion of winding of the belt body 13, the controller 15 (adjustment section 42b) changes a winding force of the actuator 14 to a second winding force that is smaller than a first winding force but is larger than zero. After the change of the winding force, a state in which rotation torque that generates the second winding force is generated in the motor 33 is maintained. In other words, the motor 33 constantly generates rotation torque in a direction in which the belt body 13 is wound. However, as described above, the second winding force is a small force of a degree that makes the belt body 13 tense, which exerts no burden on the user. Therefore, even if the user makes small movements, such as the user losing his/her posture, after putting on the assist device 10, the belt body 13 is not easily loosened.

In initial setting processing, an amount of winding of the belt body 13 with a first winding force differs depending on the body height of the user wearing the assist device 10. Also, an amount of winding of the belt body 13 until completion of the winding differs depending on the length of the belt body 13 in a state of being loosen in advance. Therefore, upon change of the winding force of the actuator 14 to a second winding force, the controller 15 sets a phase of the motor 33 at the time of the change, as an initial value of the phase of the motor 33. Consequently, initial setting of the phase of the motor 33 is made according to the body size of the user. Based on the initial setting, control of rotation of the motor 33 for generating an assist force can be performed. As a result, correct control of an amount of winding of the belt body 13 (first belt 16) can be performed, enabling generation of a proper assist force.

As described with reference to FIG. 5, the actuator 14 includes the motor 33, the reducer section 34 and the drive pulley 35. The reducer section 34 is formed by the plurality of gears 34g, reduces rotation of the motor 33 and outputs the resulting rotation. The drive pulley 35 is capable of winding the belt body 13 by rotating via the output of the reducer section 34. When the belt body 13 is wound on the drive pulley 35, the motor 33 provides torque in one direction to the drive pulley 35 through the reducer section 34, and the drive pulley 35 thereby rotates in a direction in which the belt body 13 is wound.

Also, for example, when the belt body 13 is unwound from the drive pulley 35 as a result of the belt body 13 being pulled by an external force generated by the user changing his/her posture, the controller 15 rotates the motor 33 as follows to provide torque to the drive pulley 35 and the drive pulley 35 thus rotates. In other words, when the belt body 13 is unwound from the drive pulley 35, while the motor 33 provides torque in a direction in which the belt body 13 is wound, to the drive pulley 35 through the reducer section 34, the drive pulley 35 rotates in a direction in which the belt body 13 is unwound.

In this way, regardless of a case where the belt body 13 is wound on the drive pulley 35 or a case where the belt body 13 is unwound from the drive pulley 35, a direction in which the motor 33 generates torque is the same. The controller 15 performs control to generate torque to the motor 33 in the direction in which the belt body 13 is wound.

With this configuration, tension acts on the belt body 13 in each of a case where the belt body 13 is wound and a case where the belt body 13 is unwound. Therefore, in a state in which the user wears the assist device 10, the belt body 13 is not loosened. In other words, tension constantly acts on the belt body 13 in a direction in which the belt body 13 is wound. Then, a direction of rotation of the gears 34g included in the reducer section 34 when the belt body 13 is unwound is opposite to a direction of rotation of the gears 34g when the belt body 13 is wound; however, in each of the case where the belt body 13 is unwound and the case where the belt body 13 is wound, only surfaces on one side of teeth of one gear 34g of the meshing gears 34g, 34g come into contact with teeth of the other gear 34g. In other words, surfaces of teeth of the meshing gears 34g, 34g, the surfaces being in contact with each other, are always the same. Therefore, even if there is a large backlash, the backlash does not affect responsiveness relating to generation of an assist force.

As described above, regardless of a case where the belt body 13 is wound or a case where the belt body 13 is unwound, the above configuration enables preventing a delay of response to generation of an assist force, the delay being caused by a backlash between the gears 34g, 34g, in the reducer section 34 and also enables preventing occurrence of an impact by the backlash. Also, as described above, a relatively large backlash is allowed between the gears 34g, 34g of the reducer section 34, and thus, there is less need for high gear accuracy. As a result, manufacturing costs of the gears 34g included in the reducer section 34 can be reduced. Note that each of the gears 34g included in the reducer section 34 may be a gear other than a spur gear and may be, e.g., a helical gear or a double-helical gear.

In the above initial setting processing, as described with reference to FIGS. 10A and 10B, the controller 15 performs control to, upon operation of the actuator 14 (motor 33) being started in a state in which the first harness 11 and the second harnesses 12 are fitted to a user, change a first winding force to be smaller than that at a start of the winding, in a time period that is later than the start of the winding. With this configuration, the first winding force becomes smaller toward completion of the winding of the belt body 13. Therefore, it is possible to prevent an impact force from the belt body 13 from being provided to the user when winding is completed.

Also, as described with reference to FIGS. 11A and 11B, the controller 15 may be configured to perform control to, upon operation of the actuator 14 (motor 33) being started in a state in which the first harness 11 and the second harnesses 12 are fitted to a user, change a speed of winding of the belt body 13 to be lower than that at a start of the winding, in a time period that is later than the start of the winding. In this case, the speed of winding of the belt body 13 becomes lower toward completion of the winding of the belt body 13. Therefore, it is possible to prevent an impact force from the belt body 13 from being provided to the user when winding is completed.

Other Assist Devices 10

Figure 9:
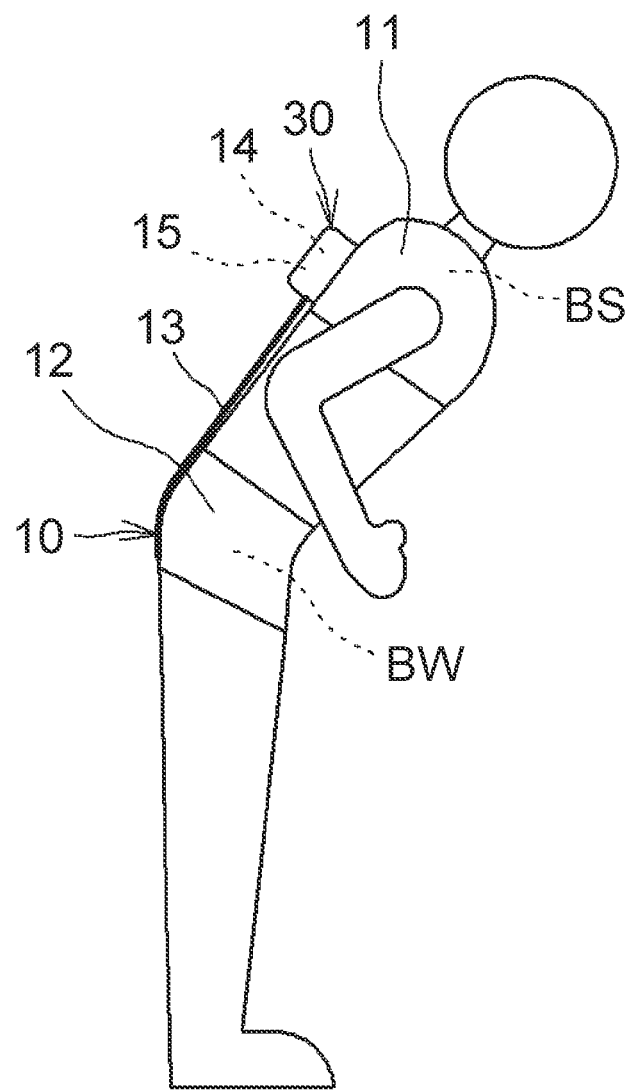
FIG. 9 is a side view of another form of assist device.

In the assist device 10 disclosed above, the second harnesses 12 are fitted to the leg regions BL of the user. As illustrated in FIG. 9, a second harness 12 may be fitted to a waist region BW of a user. In this case, the second harness 12 may have the shape of a waist belt or the shape of pants. Where a second harness 12 is fitted to a waist region BW, an actuator 14 may be attached to a first harness 11 or may be attached to the second harness 12. In FIG. 9, an actuator 14 is attached to a first harness 11.

In the case of the assist device 10 illustrated in FIG. 9, also, a belt body 13 is provided so as to extend to the first harness 11 and to the second harness 12 along the back side of the user. By the actuator 14 winding the belt body 13, tension acts on the belt body 13. The tension causes generation of an assist force for assisting the user's work, which reduces a burden on the body of the user.

Others

For prevention of pain in the lower back of a user, it is preferable that the second harnesses 12 be fitted to leg regions BL. This is because a load on a waist region BW can be reduced by the second harnesses 12 being fitted to leg regions BL. In each form of assist device 10, the belt body 13 is light in weight and can conform to the body of a user even if the user changes his/her posture, and thus follows movement of the user. Therefore, an assist device 10 that provides good wear comfort can be provided. Note that in the above disclosure, the control box 30 is provided on the rear side (back side) of a user in the first harness 11 but may be provided on the front side of a user. In this case, the belt body 13 is provided along the back of the user through shoulder regions BS of the user.

The linear form of the belt body 13 may be a form other than the illustrated form. For example, although not illustrated, as with the second attachment portion 28, a rotary pulley may be provided on the first attachment portion 27 of the joining member 18 and a first belt 16 may be hung on the rotary pulley so as to be folded at an intermediate point of the first belt 16. In this case, an end portion (on the side opposite to the drive pulley 35 side of the first belt 16) of the first belt 16 is attached to the first harness 11 (base 31). Alternatively, although not illustrated, a rotary pulley may be provided at the second harness 12 and a second belt 17 may be hung on the rotary pulley so as to be folded at an intermediate point of the second belt 17. In this case, opposite end portions of the second belt 17 are attached to a harness (third harness) to be fitted to a waist region BW.

The embodiment disclosed herein is a mere example in every respect and is not limiting. The scope of the right for the present disclosure is not limited to the above embodiment but includes all changes that come within the meaning and range of equivalency of the claims.

Supplements

In the assist device 10 of the above embodiment, the controller 15 performs control to, upon a user putting on the first harness 11 and the second harnesses 12 and operation of the actuator 14 being started, perform winding of the belt body 13 with a first winding force, and upon the winding of the belt body 13 being completed, change the winding force of the actuator 14 to a second winding force that is smaller than the first winding force. However, as a reference disclosure, there is an assist device that does not perform such control. In other words, the assist device of the reference disclosure is as follows. Note that components in the assist device of the reference disclosure that are the same as those of the assist device 10 of the above embodiment are provided with reference numerals that are the same as those of the assist device 10 of the above embodiment.

An assist device 10 of the reference disclosure (see FIG. 2) includes: a first harness 11 to be fitted to at least either shoulder regions BS or a breast region BB of a user; a second harness 12 to be fitted to a leg regions BL or a waist region BW of the user; a belt body 13 provided so as to extend to the first harness 11 and to the second harness 12 along the back side of the user; and an actuator 14 that is provided in the first harness 11 or the second harness 12 and enables winding and unwinding of a part of the belt body 13. The actuator 14 (see FIG. 5) includes a motor 33, a reducer section 34 that includes a plurality of gears 34g and reduces rotation of the motor 33 and outputs the resulting rotation, and a pulley 35 capable of winding the belt body 13 by rotating via the output of the reducer section 34. When the belt body 13 is unwound from the pulley 35, while the motor 33 provides torque in a direction in which the belt body 13 is wound to the pulley 35 through the reducer section 34, the pulley 35 rotates in a direction in which the belt body 13 is unwound.

The configurations disclosed above can be applied to the assist device of the reference disclosure.

What is claimed is:

1. An assist device comprising:
   a first harness configured to be fitted to at least one of a shoulder region and a breast region of a user;
   a second harness configured to be fitted to a leg region or a waist region of the user;
   a belt body provided so as to extend to the first harness and to the second harness along a back side of the user;
   an actuator provided in a control box on a back side of the first harness and configured to wind and unwind a part of the belt body; and
   a controller configured to
      when the first harness and the second harness are fitted to the user in a state where the belt body is drawn out, control the actuator to wind the belt body with a first winding force to draw the second harness towards the first harness, and
      control the actuator to wind the belt body with a second winding force that is smaller than the first winding force when the winding of the belt body is complete.

2. The assist device according to claim 1, wherein the second winding force is larger than zero.

3. The assist device according to claim 1, wherein:
   the actuator includes a pulley configured to wind the belt body, and a motor for making the pulley perform an operation of winding the belt body; and
   the controller is configured to, based on a parameter relating to rotation of the pulley or the motor, detect completion of the winding of the belt body.

4. The assist device according to claim 1, wherein:
   the actuator includes a pulley configured to wind the belt body, and a motor for making the pulley perform an operation of winding the belt body; and
   the controller is configured to change the winding force of the actuator by decreasing a current supplied to the motor.

5. The assist device according to claim 1, wherein:
   the actuator includes a pulley configured to wind the belt body, and a motor for making the pulley perform an operation of winding the belt body; and
   the controller is configured to, upon the winding force of the actuator being changed to the second winding force, set a phase of the motor at a time of the change, as an initial value of the phase of the motor.

6. The assist device according to claim 1, wherein:
   the actuator includes a motor, a reducer section including a plurality of gears, the reducer section being configured to reduce rotation of the motor and output the rotation, and a pulley configured to wind the belt body by rotating via the output of the reducer section; and
   the actuator is configured in such a manner that, when the belt body is unwound from the pulley, while the motor provides torque in a direction in which the belt body is wound, to the pulley through the reducer section, the pulley rotates in a direction in which the belt body is unwound.

7. The assist device according to claim 1, wherein the controller is configured to, upon operation of the actuator being started, perform control to change the first winding force to be smaller than that at a start of the winding, in a time period that is later than the start of the winding.

8. The assist device according to claim 1, wherein the controller is configured to, upon operation of the actuator being started, perform control to change a speed of winding of the belt body to be lower than that at a start of the winding, in a time period that is later than the start of the winding.

* * * * *